United States Patent Office 2,702,823
Patented Feb. 22, 1955

2,702,823

SUBSTITUTED DIALDEHYDES AND PREPARATION OF THE SAME

Curtis W. Smith and Douglas G. Norton, Berkeley, Calif., assignors to Shell Development Company, San Francisco, Calif., a corporation of Delaware No Drawing. Application March 23, 1948,
Serial No. 16,617

12 Claims. (Cl. 260—602)

This invention relates to new and useful organic compounds. More particularly, the present invention relates to new and commercially valuable organic compounds that may be prepared by a process comprising reacting methacrolein and homologous alpha-methylene aldehydes with alcohols in the presence of alkaline catalysts. In a more specific embodiment, the present invention relates to alpha,gamma-dimethyl-alpha-alkoxymethylglutaraldehyde and to a method for the production thereof comprising reacting methacrolein with an alcohol in the presence of an alkaline catalyst.

The compounds to which the invention relates have been found to possess desirable characteristics which could not have been foreseen and which render the compounds of improved value in various applications. For example, the substituted glutaraldehydes to which the invention relates have characteristics which make them of interest as intermediates for the production of dyes or dye-intermediates. They have been found to be useful raw materials for the production of products which have excellent stability, low volatility, and a high degree of miscibility with high molecular weight polymeric materials. The novel substituted glutaraldehydes therefore are of value as raw materials for the production of improved plasticizers for synthetic resins, rubbers, and the like. The novel products of the invention also have unique precipitant or insolubilizing action upon proteins or proteinaceous substances. They therefore are useful as improved precipitants or hardening agents in the preparation of fibers and other shaped articles of manufacture from casein and like proteins, e. g., soya bean protein. The substituted glutaraldehydes of the invention also have been found to have characteristics which render them of particular value as materials to be used in the preparation of resins. An unexpected property that is of particular interest in this respect is a stability of the novel dialdehydes that is evidenced by a minimal tendency of the aldehydes to condense with themselves. Due to this property, the substituted glutaraldehydes of the invention are of improved value as reactants in the manufacture of polymers by condensation with phenols, urea, melamine, and like materials.

The compounds to which the invention relates are, broadly, substituted glutaraldehydes wherein the carbon atom immediately adjacent to one formyl group is a tertiary carbon atom and the carbon atom immediately adjacent to the other carbon atom is a quaternary carbon atom and wherein one of the carbon atoms to which said quaternary carbon atom is attached is the carbon atom of an alkoxy-substituted methyl group. The novel dialdehydes may be illustrated by the specific group of compounds which has the characteristic structure

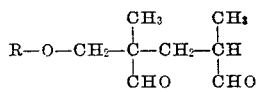

in which R represents an aliphatic hydrocarbon group. An illustrative compound of the class of compounds is alpha,gamma - dimethyl - alpha - methoxymethylglutaraldehyde. This compound may also be named as the monomethyl ether of alpha-methylol-alpha,gamma-dimethylglutaraldehyde, or as 2,4-dimethyl-2-(methoxymethyl)pentanedial. Instead of the methoxy group the compounds of the invention may contain alkoxy groups homologous to the methoxy group, or substituted alkoxy groups. Representative alkoxy groups homologous to the methoxy group include, for example, ethoxy, propoxy, isopropoxy, the butoxy groups, the pentoxy groups, the hexoxy groups and homologous alkoxy groups. Although the alkoxy group may contain as many as eighteen carbon atoms, a preferred group of compounds are those in which the alkoxy group contains from one to eight carbon atoms. It will be understood that the aliphatic hydrocarbon group represented by R may be either an unsubstituted aliphatic hydrocarbon group or a substituted aliphatic hydrocarbon group. For example, the alkoxy substituent group may be an unsubstituted alkoxy group, or one or more of the hydrogen atoms may have been replaced by suitable substituent groups. Suitable substituent groups include, among others, aromatic groups, e. g., phenyl, naphthyl, tolyl, xylyl, etc., cyclo aliphatic groups, such as cyclohexyl, cyclopentyl, cyclohexenyl, etc., unsaturated hydrocarbon groups, such as vinyl, allyl, isopropenyl, isocrotyl, 2,4-butadienyl, pentadienyl, as well as ethynyl, and 1-propynyl and 2-propynyl, etc., alkoxy groups, such as methoxy, etc., the hydroxyl group, halogen, e. g., chlorine or bromine, or nitro, sulfo, etc.

The unique properties of the present compounds appear to be due, at least in part, to the alkoxy substituted methyl group that is directly linked to the quaternary carbon atom in the alpha position of the glutaraldehyde residue. For example, if both methyl groups that are attached to this quaternary carbon atom are unsubstituted, or if instead of the alkoxy substituent group there is, for example, a hydroxyl group bonded to one of the methyl groups, the compounds are readily distinguishable from the novel compounds to which the present invention relates by virtue of their properties which differ markedly from the properties of the present novel compounds.

Although the compounds corresponding to the above formula where R represents a saturated hydrocarbon group are thus provided by the invention, the invention in its broader aspects is not limited thereto. For example, a highly valuable group of compounds is represented by the formula where R signifies an unsaturated hydrocarbon group of the allyl-type. An illustrative compound of this character that is included in the invention is the substituted glutaraldehyde that may be designated as alpha,gamma - dimethyl - alpha - allyloxymethylglutaraldehyde, or, in other words, 2,4-dimethyl-2-(allyloxymethyl)pentanedial. Instead of the allyl group, other unsaturated hydrocarbon groups of the allyl-type may be bonded to the ethereal oxygen atom. In this valuable subgroup of compounds, the hydrocarbon group bonded to the ethereal oxygen atom therefore may be any group which contains an arrangement of atoms such that the carbon atom which is attached to the ethereal oxygen atom is also directly attached through a single bond to a second carbon atom which in turn is directly attached through a double bond to a third carbon atom. The other valencies of these three carbon atoms may be satisfied by union with hydrogen atoms or with suitable other atoms or structural groupings. They may be attached, for example, to alkyl radicals, such as methyl, ethyl, propyl, butyl, hexyl, octyl, nonyl, decyl, etc., or to phenyl, cyclohexyl, etc. groups, to a halogen atom, an alkoxy group, etc.

Representative allyl-type groups which may be attached to the ethereal oxygen atom in the foregoing subgroup of compounds provided by the invention include in addition to the allyl group, the methallyl, crotyl, chlorallyl, methoxyallyl, 1-methylallyl, 2-ethylallyl, 2-propylallyl, 2-methylcrotyl, 2-butylallyl, 2-propyl-2-pentyl, 2-isopropylpentenyl, 1-vinylallyl, 2-cyclohexylallyl, as well as the tiglyl and the cinnamyl radicals.

When the allyl-type hydrocarbon group that is bonded to the ethereal oxygen atom is one in which the beta,gamma olefinic bond is of the vinyl type (i. e., $CH_2=C<$), the substituted glutaraldehydes have unique properties that render them of especial value as intermediates for the preparation of resins.

In the above formula the compounds of the invention have been illustrated by the compounds wherein methyl groups are directly attached to the alpha and the gamma carbon atoms of the glutaraldehyde residue. Instead of the methyl group, there may be attached to the alpha and the gamma carbon atoms of the glutaraldehyde residue other hydrocarbon groups, such as alkyl, cycloalkyl, aryl, alkaryl or aralkyl groups. A preferred group of compounds is obtained when the hydrocarbon groups that are attached to the alpha and the gamma carbon atoms of the glutaraldehyde residue are lower alkyl groups, e. g., methyl, ethyl, propyl, isopropyl, a butyl, a pentyl, or a hexyl group.

The following compounds may be mentioned as illustrative of the novel substituted glutaraldehydes that are provided by the invention:

alpha,gamma - dimethyl - alpha - (methoxymethyl)glutaraldehyde
alpha,gamma - dimethyl - alpha - (ethoxymethyl)glutaraldehyde
alpha,gamma - dimethyl - alpha - (propoxymethyl)glutaraldehyde
alpha,gamma - dimethyl - alpha - (isopropoxymethyl)glutaraldehyde
alpha,gamma - dimethyl - alpha - (butoxymethyl)glutaraldehyde
alpha,gamma - dimethyl - alpha - (isobutoxymethyl)glutaraldehyde
alpha,gamma - dimethyl - alpha - (phenethoxymethyl)glutaraldehyde
alpha,gamma - dimethyl - alpha - (2-methoxyethoxymethyl)glutaraldehyde
alpha,gamma - dimethyl - alpha - (cyclohexylmethoxymethyl)glutaraldehyde
alpha,gamma - dimethyl - alpha - (benzyloxymethyl)glutaraldehyde
alpha,gamma - dimethyl - alpha - (allyloxymethyl)glutaraldehyde
alpha, gamma - dimethyl - alpha - (methallyloxymethyl)glutaraldehyde
alpha,gamma - dimethyl - alpha - (2-butenyloxymethyl)glutaraldehyde
alpha,gamma - dimethyl - alpha - (cinnamyloxymethyl)glutaraldehyde
alpha,gamma - dimethyl - alpha - (2,4-butadienyloxymethyl)glutaraldehyde
alpha,gamma - dimethyl - alpha - (2 - cyclohexenyloxymethyl)glutaraldehyde
alpha,gamma - dimethyl - alpha - (2 - ethylallyloxymethyl)glutaraldehyde
alpha,gamma - dimethyl - alpha - (propargyloxymethyl)glutaraldehyde
alpha,gamma - diethyl - alpha - (methoxymethyl)glutaraldehyde
alpha,gamma - diethyl - alpha - (allyloxymethyl)glutaraldehyde
alpha,gamma - diethyl - alpha - (methallyloxymethyl)glutaraldehyde
alpha,gamma - dipropyl - alpha - (ethoxymethyl)glutaraldehyde
alpha, gamma - dicyclohexyl - alpha - (ethoxymethyl)glutaraldehyde
alpha, gamma - diisopropyl - alpha - (2 - chloroethoxymethyl)glutaraldehyde
alpha,gamma - dimethyl - alpha - (octyloxymethyl)glutaraldehyde
alpha,gamma - dimethyl-alpha(2,4,6-trimethylheptyloxymethyl)glutaraldehyde
alpha,gamma - dimethyl - alpha - (dodecyloxymethyl)glutaraldehyde
alpha,gamma - diethyl - alpha - (tetradecyloxymethyl)glutaraldehyde
alpha,gamma - dimethyl - alpha-(hexadecyloxymethyl)glutaraldehyde
alpha,gamma - dimethyl - alpha - (octadecyloxymethyl)glutaraldehyde
alpha,gamma - dimethyl - alpha-(octadecenyloxymethyl)glutaraldehyde According to the process of the invention, the novel substituted glutaraldehydes may be prepared by reacting a suitable alpha-methylene aldehyde with an alcohol under controlled conditions and in the presence of a regulated amount of a basic condensation catalyst. The overall reaction which is effected in the execution of the process of the invention may be described by the following equation:

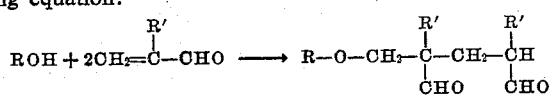

In this equation, ROH signifies an alcohol containing the hydrocarbon group R. R' represents a hydrocarbon group, preferably an alkyl, cycloalkyl, aryl, alkaryl or aralkyl group. For example, when R represents allyl and R' represents methyl, allyl alcohol is reacted with methacrolein and the product is alpha,gamma-dimethyl-alpha-(allyloxymethyl)glutaraldehyde. The hydrocarbon group R may be the hydrocarbon group of any suitable alcohol which is to be reacted with the unsaturated aldehyde, and may be, for example, saturated, unsaturated, open-chain, cyclic, etc. The selection of the aldehyde and the alcohol will depend upon the substituted glutaraldehyde that it is desired to prepare. However, the reaction proceeds with particularly advantageous yields when methacrolein is employed as the unsaturated aldehyde.

The method of the invention essentially comprises reacting the unsaturated aldehyde with the alcohol in the presence of a small amount of a basic condensation catalyst, under conditions of temperature and amounts of the catalyst which are conducive to the desired reaction but which do not promote excessive side reactions, polymerization of the unsaturated aldehyde, etc. Temperatures of from about 0° C. to about 50° C. are preferred. Higher temperatures tend to cause excessive polymerization of the unsaturated aldehyde, while at temperatures much below 0° C. the reaction is unduly slow. An optimum range when methacrolein is employed as the unsaturated aldehyde is from about 15° C. to about 40° C.

The reaction is catalyzed by the presence of a small amount of a basic-acting substance. The basic compounds of the alkali metals, e. g., the hydroxides are eminently effective. For example, sodium hydroxide, potassium hydroxide, lithium hydroxide, and even the hydroxides of rubidium and of caesium, may be employed. In place of the inorganic alkalies, strong organic bases may be used as the condensation catalyst, e. g., benzyltrimethylammonium hydroxide, tetramethylammonium hydroxide, etc. The amount of the catalyst that is employed is critical. This is because excessive amounts of the basic-acting substances cause polymerization of the unsaturated aldehyde. On the other hand, unless a sufficient amount of the catalyst is employed, or if non-alkaline conditions are attempted, the desired reaction does not take place. Amounts of the basic condensation catalysts sufficient to provide a concentration in the reaction mixture of from about 0.001 to 0.4 gram-equivalents per liter are generally effective, a preferred range, because of the minimal formation of by-products, being from 0.01 to 0.08 equivalents per liter.

Substantially anhydrous conditions preferably are employed in accordance with the invention. This is because in the presence of excessive amounts of water polymerization of the unsaturated aldehyde becomes excessive, and no detachable amounts of the compounds to which the invention relates are produced. If desired, the alkaline catalyst may be added in the form of a suitable aqueous solution. Because of the small amounts of the catalysts that are employed, the amounts of water thereby introduced into the reaction mixture do no harm. Inert organic solvents, e. g., ethers, hydrocarbons, heterocyclic oxygen-containing solvents, such as dioxane, etc., may be included in the mixture, as when higher alcohols are employed, although the presence of an added solvent in all cases is not a prerequisite to operability of the process.

The process of the invention may be executed by mixing the unsaturated aldehyde and the alcohol in the presence of the basic-acting substance. Molar ratios of the alcohol to the unsaturated aldehyde from about 1/2 to about 10/1 may be employed. A preferred range is from 1/1 to about 5/1. The reaction mixture may be prepared by adding the catalyst to the alcohol and thereafter adding the unsaturated aldehyde, by first mixing the aldehyde and the alcohol and then adding the catalyst to the mixture, or by substantially simultaneously mixing all three. However, the first-mentioned procedure, particularly when the aldehyde is slowly added to a solution of the catalyst in the alcohol, generally favors the maximum yields. Reaction times of from 1/2 to 10 or more hours may be employed; generally, however, reaction times of about 2 to 6 hours are adequate. During the reaction period, the temperature of the mixture is maintained within the desired limits by heating or cooling, as required.

After completion of the reaction, the catalyst may be neutralized by the careful addition of acid to the reaction mixture. Any suitable acid may be employed; however, formic acid has the unique advantage that small excesses do not cause undesired reactions that may result from the presence of corresponding amounts of other acids. Buffer mixtures also may be employed to neutralize the basic catalyst. After the catalyst has been neutralized the desired products may be recovered from the reaction mixture, e. g., by fractional distillation.

Alcohols which may be employed in the process of the invention include, among others, ethyl alcohol, methyl alcohol, propyl alcohol, isopropyl alcohol, the butyl alcohols, and homologs thereof, such as the pentyl alcohols, the hexyl alcohols, the octyl alcohols, the nonyl alcohols, and even alcohols such as decanol, dodecanol, tetradecanol, hexadecanol, and octadecanol and their branched chain analogs. Unsaturated alcohols, including allyl alcohol, methallyl alcohol, crotyl alcohol, cinnamyl alcohol, 2-pentenol, 2-ethyl-2-butenol, 2-isopropyl-2-hexenol, and even propargyl alcohol and 2-methoxyethanol also may be employed.

Suitable unsaturated aldehydes which may be employed in the process of the invention for the preparation of novel substituted glutaraldehydes to which the invention relates include, in addition to methacrolein, the following: Alpha-ethylacrolein, alpha-propylacrolein, alpha-isopropylacrolein, alpha-cyclohexylacrolein, alpha-phenylacrolein, alpha-octylacrolein, alpha-decylacrolein, and homologous and analogous substituted acroleins wherein the alpha carbon atom is tertiary and the beta carbon atom is primary.

The process of the invention may be executed in any suitable type of apparatus. It may be carried out in either a batch or a continuous manner. The alpha-methylene aldehyde and the alcohol may be mixed in continuous streams and passed through an elongated reaction zone maintained at the desired temperature. The catalyst conveniently may be dissolved in the alcohol prior to the mixing of the reactants. By correlating the rate of flow of the reaction mixture through a reaction zone, the desired reaction time is obtained. The reaction mixture issuing from the reaction zone may be neutralized and separated into its components, and any unreacted aldehyde and/or alcohol recycled through the process. In continuous operations, or in successive batchwise preparations, it has been found that by also returning to the process any by-products of the reaction, which by-products may include, for example, beta-alkoxyaldehydes, etc., with fresh feed of the unsaturated aldehyde and the alcohol reactants, yields of the substituted glutaraldehydes as high as 90% based upon the reactants consumed, may be obtained.

The following examples are presented for the purpose of illustrating certain of the specific embodiments of the invention. Although in the examples certain properties of the products are referred to in quantitative terms, it will be appreciated that these are based on the results that were observed in particular experiments. While these properties, as given, will be of assistance in identifying and characterizing the products, we do not regard them as limiting the invention, since they are the results of individual experiments, and minor variations in the observed properties of a compound from one preparation to the next are more the rule than the exception in the art of preparative organic chemistry.

*Example I*

Sufficient NaOH (in the form of a 2 N aqueous solution) was dissolved in 320 grams of methanol to form a solution containing 0.014 moles per liter of NaOH. Methacrolein, 140 grams, was added dropwise with stirring to 320 parts of the methanol solution while the temperature of the mixture was maintained at about 23° C. About one hour was required for the addition, and thereafter the mixture was allowed to stand for an additional 3 hours at about 23° C. The solution then was neutralized by addition of an amount of formic acid equivalent to the NaOH, and fractionally distilled under reduced pressure. After separation of unreacted methacrolein and methanol, and lower-boiling reaction products, alpha,gamma - dimethyl-alpha-(methoxymethyl)-glutaraldehyde was separated as a fraction distilling between 60° and 65° C. under 0.1 millimeters mercury pressure. The conversion to the substituted glutaraldehyde was 38% based upon the amount of methacrolein applied and the yield was 47% based on the methacrolein consumed. The alpha,gamma-dimethyl - alpha-(methoxymethyl)glutaraldehyde fraction thus obtained was redistilled under reduced pressure from a Claisen flask. The alpha-gamma-dimethyl - alpha - (methoxymethyl)glutaraldehyde was found to have the following approximate properties:

Boiling point_____ 63° C. at 0.1 millimeter mercury pressure.
Refractive index ($n$ 20/D)__ 1.0234.
Carbonyl value_____ 1.17 equivalents per 100 grams (calculated value, 1.16).
Per cent carbon:
   Found_____ 62.57
   Calculated for $C_9H_{16}O_3$_ 62.76
Per cent hydrogen:
   Found_____ 9.34
   Calculated for $C_9H_{16}O_3$_ 9.37

*Example II*

In this experiment, 140 grams of methacrolein were added dropwise with stirring to a solution of NaOH in 320 grams of methanol containing 0.01 equivalents per liter of NaOH. During the addition of the methacrolein the temperature was maintained at 5–10° C. by cooling. Under these conditions, no reaction was evident at this temperature, so the mixture was warmed to 20° C. at which temperature reaction was apparent (by evolution of heat). After four hours (total time) the solution was neutralized by addition of formic acid and distilled under reduced pressure. Alpha,gamma-dimethyl-alpha-(methoxymethyl)glutaraldehyde was separated in an amount corresponding to a 23% conversion of methacrolein to the product, and a yield of 31% based on the methacrolein consumed. A portion of the substituted glutaraldehyde was dissolved in a hot solution of 2,4-dinitrophenylhydrazine in ethanol, and the solution was acidified with hydrochloric acid. The copious yellow precipitate was filtered off and recrystallized from methyl ethyl ketone. Its melting point was found to be 200.2–201° C. Analysis of the dinitrophenylhydrazone gave the following results: Per cent C, 47.3; per cent H, 4.7; per cent N, 20.8. The calculated values for the bis-2,4-dinitrophenylhydrazone of alpha,gamma-dimethyl-alpha-(methoxymethyl)glutaraldehyde are as follows: Per cent C, 47.37; per cent H, 4.54; per cent N, 21.05.

*Example III*

When Example I was repeated, employing a molar ratio of methanol to methacrolein of 3.2/1, a sodium hydroxide concentration of 0.005 moles per liter of the reaction mixture, and a temperature of 28° C., the conversion of methacrolein to alpha,gamma-dimethyl-alpha-(methoxymethyl)glutaraldehyde after 4.5 hours was 40%, and after 7.5 hours was 41%.

*Example IV*

For the preparation of alpha,gamma-dimethyl-alpha-(allyloxymethyl)-glutaraldehyde, there was prepared a solution of NaOH in allyl alcohol containing 0.006 equivalents of NaOH per liter. One hundred forty grams of methacrolein were added dropwise over a period of one hour to 290 grams of the solution. During the addition the mixture was stirred and the temperature of the mixture was kept at 23° C. After an additional period of three hours at 23° C., the mixture was neutralized with formic acid and fractionally distilled under reduced pressure. Alpha,gamma - dimethyl - alpha-(allyloxymethyl)-glutaraldehyde was recovered as the fraction distilling from 67° to 69° C. under 0.5 millimeters mercury pressure. The refractive index ($n$ 20/D) of the fraction was found to be 1.4745 and the specific gravity (20°/4°) to be 1.0403. Analyses were as follows: Per cent C, 66.44; per cent H, 9.17. The values calculated for alpha,gamma-dimethyl-alpha-(allyloxymethyl)glutaraldehyde are: Per cent C, 66.64; per cent H, 9.15. The bis-2,4 - dinitrophenylhydrazone of alpha,gamma-dimethyl-alpha-(allyloxymethyl)glutaraldehyde was prepared and found to melt at 161.8° to 162.8° C.

*Example V*

When Example IV was repeated, employing a molar ratio of allyl alcohol to methacrolein of 3/1 and a 0.02 N concentration of NaOH in the reaction mixture, alpha,- gamma-dimethyl - alpha - (allyloxymethyl)glutaraldehyde was recovered in an amount corresponding to a 44% conversion of methacrolein to product. Equivalent results are obtained when benzyltrimethylammonium hydroxide is employed as catalyst.

Example VI

Alpha,gamma - dimethyl - alpha-(ethoxymethyl)glutaraldehyde was prepared in a 38% conversion of methacrolein to product by reacting methacrolein and ethyl alcohol in the presence of NaOH according to the procedure of Example II. A molal ratio of ethyl alcohol to methacrolein of 5/1 and a sodium hydroxide concentration in the reaction mixture of 0.005 N were employed. The reaction temperature was 23° C. The alpha,gamma-dimethyl-alpha-(ethoxymethyl)glutaraldehyde was found to distill at 71° to 73° under a pressure of 0.5 millimeter mercury, and to have a refractive index ($n$ 20/D) 1.4528 and a specific gravity (20°/4°) 1.0052. Analyses were as follows: Per cent C, 64.43; per cent H, 9.75. Calculated values for $C_{10}H_{18}O_3$ are: Per cent C, 64.49; per cent H, 9.74. The bis-2,4-dinitrophenylhydrazone of alpha,gamma - dimethyl-alpha-(ethoxymethyl)glutaraldehyde was prepared and found to melt at 172° to 172.9° C.

Example VII

To 360 grams of methallyl alcohol containing 0.007 gram-equivalents per liter of NaOH there were added dropwise and with stirring 70 grams of methacrolein. After 4 hours at 23° C., the mixture was neutralized by addition of formic acid and fractionally distilled. The product, alpha,gamma - dimethyl - alpha - (methallyloxymethyl)glutaraldehyde was recovered in a 34% conversion, based on the methacrolein consumed. The alpha,-gamma - dimethyl-alpha-(methallyloxymethyl)glutaraldehyde distilled at 91° to 92° C. under 0.5 millimeter mercury pressure, and was found to have a refractive index ($n$ 20/D) of 1.4690 and a specific gravity (20°/4°) of 1.006. Its bis-2,4-dinitrophenylhydrazone was prepared and found to melt at 179 to 179.5° C. Analyses of the substituted glutaraldehyde prepared in this example were as follows: Per cent C, 67.84; per cent H, 9.52. Calculated values for $C_{12}H_{20}O_3$ are: Per cent C, 67.89; per cent H, 9.50.

Example VIII

In this experiment, there is illustrated a cyclic process of producing the substituted glutaraldehydes to which the invention relates, characterized by the desirably high yields of the desired product. Methacrolein, 140 grams, was added dropwise to a solution prepared by mixing 4.15 milliliters of 2 N aqueous solution of NaOH with 192 grams of methanol. The rate of addition was controlled so that the heat of reaction maintained the mixture at 30° C. After all the methacrolein had been added, the solution was allowed to stand one hour. The reaction mixture then was neutralized by addition of formic acid, and distilled. The first fraction, amounting to 229 grams, was collected at temperatures up to 60° C. under one millimeter of mercury pressure. The second fraction, amounting to 96.5 grams, was collected between 60° and 64° C. under 0.1 millimeter of mercury pressure and a residue of 13.3 grams was allowed to remain in the still kettle. The second fraction, which was the alpha,gamma-dimethyl-alpha-(methoxymethyl) glutaraldehyde, represented a 56% conversion of methacrolein to product.

The lower boiling of the two fractions taken, containing unreacted methacrolein, methanol, and by-products of the reaction, was mixed with 18 grams of methanol and 4.15 milliliters of 2 N aqueous NaOH solution, with stirring. The temperature of the mixture was maintained at about 30° C., with occasional cooling for an hour. Then 95 grams of methacrolein was added dropwise over another hour. After the solution had stood for an additional hour it was neutralized by the addition of formic acid, and distilled from a Claisen flask. Alpha,gamma - dimethyl-alpha-(methoxymethyl) glutaraldehyde was recovered as the fraction distilling between 80° and 90° C. under about one millimeter of mercury, in the amount of 97.5 grams. The product obtained represented a 90% conversion of the methacrolein added in the recycle stage of the process. The only loss, other than handling losses, appeared to be the residue formed in the reaction. In the entire experiment, the residue amounted to about 10% by weight of the methacrolein employed, indicating an overall yield in successive operations of about 90% based upon the methacrolein employed.

Example IX

Methacrolein, 37.1 grams, was added in one portion to a solution prepared by mixing 2.3 milliliters of 2 N aqueous NaOH solution with 186 grams of 3,3-dimethyl-1-pentanol. The resultant mixture was cooled as required to keep the temperature at 25 to 30° C. After two hours at this temperature, the reaction mixture was neutralized by addition of formic acid in the calculated amount, and rapidly distilled from a Claison flask. After separation of unreacted alcohol, the following fractions were collected:

A. 60° C. to 65° C. under about 1 to 4 millimeters mercury pressure; 11 grams apparently beta- (3,3-dimethyl-1-pentoxy)isobutyraldehyde.

B. 125° C. to 135° C. under about 1 to 4 millimeters mercury pressure; 28 grams, representing a 22% conversion of methacrolein to the desired product, alpha,gamma-dimethyl - alpha - (3,3 - dimethyl-1-pentoxymethyl)glutaraldehyde.

Twenty-five grams of fraction B was redistilled through a glass helix packed column under a pressure of 0.3 millimeters mercury pressure. The portion (15.5 grams) distilling at 108.5° C. was collected as the pure named product.

Example X

Methacrolein, 70 grams, was added dropwise with stirring to a solution prepared by mixing 1.2 milliliters of a 2.6 N aqueous solution of benzyltrimethylammonium hydroxide with 300 grams of isopropyl alcohol. Total reaction time was four hours, during which the temperature was maintained at about 28° C. The alkali was then neutralized and the mixture distilled. The fraction distilling between 76° C. and 78° C. under 0.5 millimeter mercury pressure was collected and found to be alpha,gamma - dimethyl - alpha - (isopropoxymethyl) glutaraldehyde, obtained in a 12% conversion of methacrolein to product. It formed when reacted with 2,4-dinitrophenylhydrazine a derivative that melted (after recrystallization) at 169.5° C. to 170° C. and that had analyses corresponding to the bis(2,4-dinitrophenylhydrazone) of alpha,gamma - dimethyl-alpha-(isopropoxymethyl)glutaraldehyde, as shown by the following values:

| | Found | Calculated for $C_{23}H_{28}N_8O_9$ |
|---|---|---|
| Percent Carbon | 49.2 | 49.3 |
| Percent Hydrogen | 5.2 | 5.0 |
| Percent Nitrogen | 19.2 | 20.0 |

Example XI

A solution of sodium hydroxide in ethylene glycol was prepared by mixing 4.56 milliliters of 2.2 N aqueous NaOH solution with 124 grams of ethylene glycol. To the solution there was added 280 grams of methacrolein, dropwise, over a period of two hours. During the addition of the methacrolein, the mixture was kept at about 30° C. After an additional hour at 30° C. the sodium hydroxide was neutralized by addition of formic acid and the neutralized solution distilled. After separation of unreacted ethylene glycol and methacrolein, a fraction distilling from 130° C. to 165° C. under 0.5 millimeter mercury pressure was collected in the amount of 97 grams. This fraction was redistilled under 0.025 millimeter mercury pressure, 80 grams distilling at 135° C. The redistilled product was identified by its chemical properties, its elemental analyses, and infra-red spectrum as the substituted glutaraldehyde alpha,gamma-dimethyl-alpha - (2-hydroxyethoxymethyl)glutaraldehyde. Analyses of the redistilled product were as follows: C, 59.64%; H, 8.98%. Calculated for $C_{10}H_{18}O_4$, C, 59.82%; H, 8.97%.

Other valuable substituted glutaraldehydes of the herein-described generic character, having attached to the quaternary carbon to which one of the formyl groups is bonded, a methyl group which has one hydrogen atom replaced by a hydroxyl-substituted alkoxy group, may be prepared by reacting similarly alpha-methylene aldehydes with glycols and higher polyhydric alcohols. The following are representative of these valuable hydroxyalkoxymethyl-substituted glutaraldehydes: alpha,gamma-dimethyl-alpha - (3 - hydroxypropoxymethyl)glutaraldehyde, alpha,gamma - diethyl-alpha-(3-hydroxypoxymethyl)glutaraldehyde, alpha,gamma-dimethyl-alpha-(2,3-dihydroxypropoxymethyl)glutaraldehyde, alpha,gamma-dimethyl-alpha - (4 - hydroxybutoxymethyl)glutaraldehyde, alpha,gamma - dimethyl-alpha-(3-hydroxy-2-methylpropoxymethyl)glutaraldehyde, and alpha,gamma-dimethyl - alpha-3-hydroxy-2-chloropropoxymethyl)glutaraldehyde.

We claim as our invention:

1. Alpha,gamma - dimethyl-alpha-(methoxymethyl) glutaraldehyde.

2. Alpha,gamma - dialkyl - alpha-(methoxymethyl) glutaraldehyde.

3. Alpha,gamma - dimethyl - alpha-(allyloxymethyl) glutaraldehyde.

4. Alpha,gamma - dimethyl-alpha-(2-hydroxyethoxymethyl)glutaraldehyde.

5. Alpha,gamma - dialkyl - alpha - (alkoxymethyl) glutaraldehyde.

6. A substituted glutaraldehyde characterized in that one carbon atom to which a formyl group is directly linked is a tertiary carbon atom and the other carbon atom to which a formyl group is directly linked is a quaternary carbon atom, said quaternary carbon atom being directly linked to a methyl group which has one hydrogen atom replaced by the alkoxy residue of a lower alkanol.

7. A substituted glutaraldehyde characterized in that one carbon atom to which a formyl group is directly linked is a tertiary carbon atom and the other carbon atom to which a formyl group is directly linked is a quaternary carbon atom, said quaternary carbon atom being directly linked to a methyl group which has one hydrogen atom replaced by an alkoxy group wherein the carbon atom that is bonded to the oxygen atom is directly attached through a single bond to a second carbon atom which in turn is directly attached through a double bond to a third carbon atom.

8. A compound according to claim 7 characterized in that the double bond is a vinylic double bond.

9. A substituted glutaraldehyde characterized in that one carbon atom to which a formyl group is directly linked is a tertiary carbon atom and the other carbon atom to which a formyl group is directly linked is a quaternary carbon atom, each of said atoms being substituted by an alkyl group of from one to six carbon atoms, said quaternary carbon atom being directly linked to a methyl group which has one hydrogen atom replaced by the alkoxy residue of a lower aliphatic alcohol.

10. Alpha,gamma - dimethyl - alpha(alkoxymethyl) glutaraldehyde.

11. A substituted glutaraldehyde characterized in that one carbon atom to which a formyl group is directly linked is a tertiary carbon atom and the other carbon atom to which a formyl group is directly linked is a quaternary carbon atom, said quaternary carbon atom being directly linked to a methyl group which has one hydrogen atom replaced by an oxygen atom which in turn is directly linked to a hydrocarbon group.

12. A substituted glutaraldehyde characterized in that one carbon atom to which a formyl group is directly linked is a tertiary carbon atom and the other carbon atom to which a formyl group is directly linked is a quaternary carbon atom, said quaternary carbon atom being directly linked to a methyl group which has one hydrogen atom replaced by a hydroxy-substituted alkoxy group of a polyhydric alcohol.

References Cited in the file of this patent

UNITED STATES PATENTS

| | | |
|---|---|---|
| 2,276,666 | Ostrowski et al. | Mar. 17, 1942 |
| 2,288,211 | Shulz | June 30, 1942 |
| 2,495,313 | Bludworth et al. | Jan. 24, 1950 |
| 2,504,680 | Gresham et al. | Apr. 18, 1950 |

FOREIGN PATENTS

| | | |
|---|---|---|
| 489,330 | Great Britain | July 21, 1938 |

OTHER REFERENCES

Fuson et al., Organic Chem., page 50 (1946), John Wiley & Sons, New York.

Brewster, "Organic Chemistry," Prentice-Hall, Inc., New York (1948), page 115.